(12) United States Patent
Schulze et al.

(10) Patent No.: US 10,670,619 B2
(45) Date of Patent: Jun. 2, 2020

(54) APPARATUS AND METHOD FOR CLEANING PIPETTING NEEDLES

(71) Applicant: EUROIMMUN Medizinische Labordiagnostika AG, Lübeck (DE)

(72) Inventors: Tassilo Schulze, Bernstadt (DE); Steffen Schroeder, Grevesmuehlen (DE); Steffen Allerheiligen-Stolzmann, Lübeck (DE); Michael Buschtez, Lübeck (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 0 days.

(21) Appl. No.: 16/050,151

(22) Filed: Jul. 31, 2018

(65) Prior Publication Data

US 2019/0041414 A1    Feb. 7, 2019

(30) Foreign Application Priority Data

Aug. 1, 2017   (EP) .................................... 17001318

(51) Int. Cl.
*G01N 35/10*   (2006.01)
*B01L 3/02*    (2006.01)

(52) U.S. Cl.
CPC .......... *G01N 35/1004* (2013.01); *B01L 3/021* (2013.01); *B01L 13/02* (2019.08); *B01L 2300/0887* (2013.01)

(58) Field of Classification Search
CPC ................. G01N 35/1004; B01L 3/021; B01L 2300/0887
See application file for complete search history.

(56) References Cited

U.S. PATENT DOCUMENTS

| 2,827,063 | A | * | 3/1958 | Roy ........................ B01L 13/02 |
| | | | | 134/171 |
| 3,842,680 | A | * | 10/1974 | Vollick .................... B01L 3/021 |
| | | | | 134/37 |
| 4,516,437 | A | * | 5/1985 | Pedroso ............. G01N 35/1004 |
| | | | | 134/21 |
| 4,817,443 | A | | 4/1989 | Champseix et al. |
| 5,408,891 | A | * | 4/1995 | Barber ................ G01N 35/1004 |
| | | | | 73/864.22 |

(Continued)

FOREIGN PATENT DOCUMENTS

DE       102 07 499       9/2003
EP       0 661 542        7/1995

(Continued)

*Primary Examiner* — Sharidan Carrillo
(74) *Attorney, Agent, or Firm* — Grüneberg and Myers PLLC (57) ABSTRACT

A device can clean at least one pipetting needle with a washing station. In the device, the inside and an outside of the pipetting needle are brought into contact at least for a portion with a washing liquid, at least temporarily during a cleaning process, and with at least one movement apparatus, by which a relative movement is brought about between the pipetting needle and the washing station at least temporarily before, after, or during the cleaning process. The device has a drying device, which subjects at least one region of the pipetting needle brought into contact with washing liquid during the cleaning process to at least one flow of a drying agent.

9 Claims, 7 Drawing Sheets

(56) References Cited

U.S. PATENT DOCUMENTS

| | | | | |
|---|---|---|---|---|
| 5,827,744 | A * | 10/1998 | Fose | B08B 3/04 |
| | | | | 436/49 |
| 6,491,761 | B1 * | 12/2002 | Wray | C23G 3/029 |
| | | | | 134/15 |
| 2003/0213504 | A1 * | 11/2003 | Cerra | B08B 9/0323 |
| | | | | 134/23 |
| 2005/0235762 | A1 * | 10/2005 | Sinclair | B01L 3/0217 |
| | | | | 73/864.01 |
| 2010/0135853 | A1 * | 6/2010 | Broga | G01N 1/10 |
| | | | | 422/51 |
| 2012/0227771 | A1 | 9/2012 | Waterbury et al. | |
| 2013/0143257 | A1 * | 6/2013 | Small | G01N 35/1009 |
| | | | | 435/29 |

FOREIGN PATENT DOCUMENTS

| | | |
|---|---|---|
| EP | 1 213 588 | 6/2002 |
| JP | 57-41162 | 3/1982 |
| JP | 62-242858 | 10/1987 |

\* cited by examiner

APPARATUS AND METHOD FOR CLEANING PIPETTING NEEDLES

BACKGROUND OF THE INVENTION

Field of the Invention

The invention relates to a device (apparatus) as well as a method for cleaning at least one pipetting needle as well as an analysis instrument with a correspondingly designed cleaning device. A device of this kind for the cleaning of at least one pipetting needle has a washing station, by which an inside and an outside of the pipetting needle are brought into contact at least for a portion with at least one washing liquid, at least temporarily during a cleaning process. Moreover, there is provided at least one movement means, by which a relative movement is brought about between the pipetting needle and the washing station at least temporarily before, after, or during the cleaning process.

Discussion of the Background

A multitude of automatic machines are known for the study of animal or human samples, with which automatic machines test strips or tissue samples are incubated with a liquid in automated fashion, making use of pipetting needles. The liquids which need to be appropriately dispensed and pipetted, depending on the analysis performed, are a human sample, such as blood, urine, or spinal fluid, or a reagent or staining agent specific to the study. In order to prevent samples or reagents from being carried over between the different investigations and steps of an investigation, such analysis instruments often have washing stations, with which the reusable pipetting needles are cleaned on the inside and outside. The pipetting needles are dipped into a corresponding washing liquid or sprayed with it, and the washing liquid is replaced after one or more washing processes.

Alternatively to this technical solution in which the pipetting needles are washed and reused, sometimes disposable pipettes or syringes will be used.

In this context, a device for the cleaning of pipetting needles is known from EP 1 213 588 A1, wherein the pipetting needle being cleaned is dipped into a basin filled with washing liquid and sprayed on the outside with a washing liquid. In this case, the amount of washing liquid present in the basin can be varied specifically.

Furthermore, another device for the cleaning of pipetting needles is known from U.S. Pat. No. 4,817,443, in which the washing liquid is introduced via an inlet into a cavity surrounding the pipetting needle and aspirated away through an outlet provided in the lower region of the cavity. During the cleaning of the outside of a pipetting needle, the pipette tip is located in a suitably shaped recess, so that the interior space of the pipetting needle is sealed off from the cavity. A cleaning of the inside of the pipetting needle is accomplished by removing the pipetting needle slightly from the recess and delivering washing liquid through the pipetting needle in a second cleaning step. The dirty washing liquid emerging from the pipetting needle is likewise aspirated away through the outlet.

From EP 0 661 542 A2 there is known a further device for the cleaning of a pipetting needle with the aid of a washing liquid. Furthermore, with the technical solution described in this publication, both the inside and the outside of the pipetting needle are cleaned. While the inside is cleaned by introducing a washing liquid into the pipetting needle, the cleaning of the outside is done by moving the pipetting needle relative to the washing station, during which washing liquid is applied by nozzles to the outside of the pipetting needle. Dirty washing liquid is aspirated by means of an aspiration from the annular gap between the washing station and the pipetting needle.

The problem with the known solutions for the automated cleaning of pipetting needles is that often a contact between dirty washing liquid and areas being cleaned is not ruled out and sometimes contaminants are delivered into regions of the pipetting needle that were free of contaminants up to that time. If highly adherent or creeping substances such as stains are used, the surfaces of the pipetting needles are quickly contaminated by the stain. After the completion of the cleaning process, the pipetting needles in these instances are usually coated with a liquid film, and liquid droplets are formed at the pipetting needle tips. During repeated pipetting processes, this leads to a diluting of the substance being pipetted.

In order to be able to ensure a satisfactory cleaning of the pipetting needles, special chemicals are used in some cases, said chemicals being costly, sometimes corrosive to the surface of the pipetting needles, and having to be removed from the dirty washing liquid in order to be able to dispose of said chemicals properly.

Since a multitude of tests are performed at modern laboratories nowadays, the economic viability of the automatic laboratory analyser plays a major role. An important factor here is how long it takes to perform individual tests, including the cleaning of the automatic machines and the accessories, such as pipetting needles. In this regard as well the known devices and methods for the cleaning of pipetting needles are often not a satisfactory solution for ensuring a cleaning of the pipetting needles both in a short time and with uniform good quality.

Starting from the devices known from the prior art for the cleaning of pipetting needles as well as the problems discussed above, the problem which underlies the invention therefore is to develop a corresponding cleaning device such that the pipetting needles of analysis instruments are reliably cleaned in a brief time, making use of the smallest possible amounts of washing liquid. In particular, the technical solution to be presented should ensure that a pipetting needle is provided after the end of the cleaning process, said pipetting needle having neither contaminants nor residues of the washing liquid used for the cleaning. Unwanted dilution and/or contamination of the other substances being pipetted should be prevented. At the same time, contamination of noncontaminated regions of the pipetting needle during the cleaning process should be prevented. Likewise, the use of different washing liquids should be possible. On the whole, the cleaning should be done in such a way that a pipetting needle after a performance of a test is cleaned again as fast as possible and ready to carry out further tests.

SUMMARY OF THE INVENTION

This and other objects have been achieved by the present invention described at least in the following embodiments.

1. Device for cleaning of at least one pipetting needle (2) with a washing station (3), by which an inside and an outside of the pipetting needle (2) are brought into contact at least for a portion with a washing liquid, at least temporarily during a cleaning process, and with at least one movement means (12), by which a relative movement is brought about between the pipetting needle (2) and the washing station (3) at least temporarily before, after, or during the cleaning process, characterized in that a drying device (4) is provided, which subjects at least one region (5) of the pipetting needle (2) brought into contact with washing liquid during the cleaning process to at least one flow of drying agent (6).

2. Device according to embodiment 1, characterized in that the flow of drying agent (6) to which the pipetting needle (2) is subjected for at least a portion by the drying device (4) comprises a radiation, a heat flux, and/or an air stream.

3. Device according to embodiment 2, characterized in that the drying device (4) is designed such that it generates by means of an air nozzle (7) at least one air stream in the form of an air sword directed onto the outer surface (8) of the pipetting needle (2).

4. Device according to one of embodiments 1 to 3, characterized in that the movement means (3) comprises a holder (9) for fastening the pipetting needle (2) and the pipetting needle (2) is moved relatively to the washing station (3) during the cleaning process.

5. Device according to one of embodiments 1 to 4, characterized in that the washing station (3) comprises at least one liquid nozzle (10), by which the outer surface (8) of the pipetting needle (2) is subjected to a directed jet of the washing liquid at least temporarily during the cleaning process.

6. Device according to one of embodiments 1 to 5, characterized in that the pipetting needle (2) is moved during the cleaning process by the movement means (3) at least temporarily towards a pipetting needle end, which lies opposite a pipetting needle tip.

7. Device according to embodiment 5 or 6, characterized in that the pipetting needle (2) is moved upwards at least temporarily during the cleaning process by the movement means (3) along the at least one nozzle as well as the drying device (4).

8. Device according to one of embodiments 1 to 7, characterized in that the washing station (3) is designed such that at least two different volume flows of washing liquid are delivered on the inside (11) of the pipetting needle (2) during the cleaning process.

9. Method for the cleaning of at least one pipetting needle (2) with a washing station (3), by which an inside and an outside (11, 8) of the pipetting needle (2) are brought into contact at least for a portion with a washing liquid, at least temporarily during a cleaning process, and with at least one movement means (3), which moves the pipetting needle (2) relatively at least temporarily before, after, or during the cleaning process, characterized in that at least one region (5) of the pipetting needle (2) brought into contact with washing liquid during the cleaning process is dried at least temporarily with at least one flow of drying agent (6).

10. Method according to embodiment 9, characterized in that an air stream in the form of a fan-shaped air sword is directed onto the surface of the outside (8) of the pipette (2).

11. Use of a device according to at least one of embodiments 1 to 8 in an analysis instrument, an automatic laboratory analyser, an automatic stainer and/or in an automatic incubator.

12. Use of a device according to at least one of embodiments 1 to 8 in an automatic stainer for the staining of pathohistochemical tissue sections.

DETAILED DESCRIPTION OF THE INVENTION

The prescribed problem is solved with a device according to embodiment 1 as well as a method according to embodiment 10. Moreover, the invention is solved in an analysis instrument, as indicated in embodiment 12. Advantageous embodiments of the invention are contained in each of the dependent embodiments listed above and shall be explained more closely in the following description, sometimes referring to the figures.

The invention relates to a device for the cleaning of at least one pipetting needle with a washing station, by which an inside and an outside of the pipetting needle are brought into contact at least for a portion with a washing liquid, at least temporarily during a cleaning process, and with at least one movement means, by which a relative movement is brought about between the pipetting needle and the washing station at least temporarily before, after, or during the cleaning process. The device according to the invention is characterized in that a drying device is provided, which subjects at least one region of the pipetting needle brought into contact with at least one washing liquid during the cleaning process to at least one flow of drying agent. Thus, it is essential to the cleaning device according to the invention that the cleaning device comprises a drying device, which reliably frees the cleaned pipetting needle of washing liquid after carrying out the cleaning process. The device according to the invention thus implements a two-stage method, wherein the cleaning of the inside and outside of the pipetting needle occurs in a first stage, while in a second stage the region brought into contact with washing liquid is subjected to a flow of drying agent such that no washing liquid remains on the surface of the pipetting needle. It is basically conceivable, in this context, to perform a corresponding drying on both the inside and the outside. Preferably, such a drying occurs with a flow of drying agent on the outside of a pipetting needle. Moreover, the pipetting needle is preferably moved at least temporarily after the end of the cleaning process and during the drying process such that the washing liquid remaining on the pipetting needle is reliably removed from the surface of the outside of the pipetting needle with the aid of the flow of drying agent.

According to one special embodiment of the invention, the flow of drying agent to which the surface of the pipetting needle is subjected for at least a portion by the drying device comprises a radiation, a heat flux, and/or an air stream. It is important here that a flow of drying agent is generated which ensures the complete removal of the washing liquid present on the pipetting needle after the conclusion of the washing or cleaning process. In this regard, it is conceivable for the washing liquid remaining on the pipetting needle to be evaporated with the aid of radiation, especially infrared radiation, and/or a heat flux, so that after the washing and the drying process a cleaned and totally dried pipetting needle is provided with no traces of washing liquid.

In one especially advantageous development of the invention, the flow of drying agent is configured as an air stream, which is directed onto the outside of the pipetting needle. For this, the drying device comprises at least one air nozzle, which aims a directed air stream at the surface of the outside of the pipetting needle. Preferably, the air nozzle and its air supply are designed such that an air stream in the form of an air sword, air knife or air curtain is generated, which reliably removes washing liquid remaining on the surface of the pipetting needle from its surface. It is conceivable in this context for the pipetting needle to be moved during the drying process relative to the drying device, so that with the aid of the air stream generated by means of the drying device, especially in the form of an air knife or air sword, washing liquid remaining on the surface of the pipetting needle is stripped off against the direction of movement of the pipetting needle, preferably in the direction of the pipetting needle tip.

Advantageously it is conceivable for the pipetting needle to be drawn upwards during the drying process, so that the air stream strips off the washing liquid remaining on the surface of the pipetting needle downwards in the direction of the pipetting needle tip. Excess washing liquid which is thus stripped off with the aid of an air sword from the surface of the pipetting needle is either aspirated away by means of an aspiration or caught in a container arranged beneath the drying device.

In one special embodiment, the movement means comprises a holder for fastening the pipetting needle so that the pipetting needle is moved relatively to the cleaning device during the cleaning process. Preferably, the pipetting needle is at first introduced from above into the not yet activated cleaning device. Starting from the lowermost point, the pipetting needle is now moved upwards, wherein washing liquid is applied with the aid of cleaning nozzles to the surface of the outside of the pipetting needle and the now dirty washing liquid drains down into a catching container or is carried away by an aspiration. Before, after, or during the cleaning of the outside of the pipetting needle, the inside of the pipetting needle is also brought into contact with a washing liquid with the aid of at least one cleaning nozzle, preferably two oppositely arranged cleaning nozzles, in that the washing liquid flows from top to bottom in the direction of the pipetting needle tip through the interior space of the pipetting needle. The liquid emerging from the pipetting needle is once again optionally aspirated or caught in a suitable catching container.

Advantageously, the cleaning nozzles are designed such that the liquid jet has sufficient kinetic energy to reliably remove contaminants on the surface of the outside of the pipetting needle. It is important in this context that the cleaning of the pipette surface occurs not simply by the applying of washing liquid and possibly the use of special chemicals, but is also effected by the kinetic energy of the liquid jet. The at least one cleaning nozzle including the washing liquid supply is designed such that, based on the magnitude of the liquid volume flow as well as the special shaping of the jet of washing liquid, a mechanical cleaning of the pipette surface occurs at least partly. It is advantageous in this context for the washing station to have at least two oppositely arranged washing nozzles, wherein a liquid jet is generated which is adapted to the respective diameters of the pipetting needles, so that the pipetting needle is cleaned uniformly by a water jet on all sides. Advantageously, the at least one or the two liquid nozzles are designed suitably in terms of their exit cross section as well as the contour and shaping of the exit surface.

In one special embodiment, the washing station comprises a base body, which is preferably made at least in part of a plastic. The base body comprises in this context at least one recess, having a liquid nozzle. In order to protect the base body, especially the outer edges of the liquid nozzle, especially against abrasion effects, a protection element such as a shaped sheet metal element is provided preferably in the region of the liquid exit region of the at least one liquid nozzle, and here especially in the region of an edge running along the circumference of the nozzle outlet. According to one especially suitable embodiment of the invention, the liquid nozzle is designed as a separate nozzle component, preferably a sheet metal component, which is arranged in the base body. The nozzle component advantageously has a radius at the nozzle outlet in the region of a circumferential edge so as to fan out the nozzle jet. Alternatively or in addition, the base body is preferably designed such that the nozzle jet is deflected against the direction of movement of the pipetting needle during the cleaning process, especially downwards.

According to one particular development of the invention, the at least one cleaning nozzle is designed such that the liquid jet directed onto the surface of the outside of the pipetting needle is in the form of a fan. This measure makes sure that contaminants and deposits, such as are caused by sample material or stains usually employed in a biochemistry laboratory, such as haematoxylin, eosin, Congo red, or similar substances, can be relatively easily removed from the pipette surface. Furthermore, thanks to the movement of the pipetting needle along the at least one cleaning nozzle and a preferably at least slight inclination of the axis of the liquid jet against the direction of movement, the washing liquid together with the contaminants is carried away in the direction of the pipette tip. It is thus ensured that regions of the pipetting needle already cleaned are not again contaminated and the washing liquid contaminated with contaminants is reliably taken away in an aspiration or a catching container provided for this purpose.

The cleaning of the inside or the surfaces arranged in the interior space of the pipetting needle occurs advantageously in that washing liquid with different flow velocities or different volume or mass flows is conducted through the interior space of the pipetting needle in the direction of the pipetting needle tip during one cleaning cycle. It is especially advantageous in this regard when the inside of the pipetting needle in a first cleaning step receives a slow flow of washing liquid, wherein in particular during this first cleaning step for the inside around 200-300 µl, preferably between 240 and 270 µl of the washing liquid is delivered with a volume flow of 90-110 µl/s. In a second cleaning step of the interior space of the pipetting needle, liquid is dripped into the interior space of the pipetting needle over a comparatively long period of 4-7 seconds. In this period of time, around 40-70 µl, preferably 50 µl of washing liquid with a volume flow of 9-11 µl/s is dripped into the interior space of the pipetting needle.

After this so-called dripping of the interior space, once again a quantity of 240-270 µl of washing liquid is conducted through the pipetting needle slowly for a period of 2-3 seconds, i.e., once again a volume flow of around 90-110 µl/s.

This multistage, interval by interval cleaning process of the surfaces in the interior space of the pipetting needle concludes with a high-pressure cleaning step, during which liquid with especially high velocity is delivered in a short interval of time through the pipetting needle. In this last step, which lasts for 0.02-0.03 s, approximately 25-35 µl of a washing liquid with a volume flow of 1100-1300 µl/s is delivered through the interior space of the pipetting needle. Thanks to this abrupt delivery of a relatively large volume flow of the washing liquid, which is almost spat through the interior space of the pipetting needle, over a relatively short period of time, the last drops of the washing liquid at the tip of the pipetting needle are reliably carried away and removed from the pipetting needle.

Of course, the selected time spans, number of washing steps and/or volume flows may be changed, in particular by variation of the pipetting needle geometry. It is important that each time different volume flows of the washing liquid are conducted through the pipetting needle in several consecutive washing steps. In a last step, in this context, liquid is almost spat through the pipetting needle, as described above, in order to carry away the last remaining liquid residues at the needle tip, while in another step a dripping of washing liquid at the needle tip is brought about by introducing a very slight amount of liquid.

Advantageously, the cleaning of the interior space of the pipetting needle takes place at least partly at the same time as the cleaning of the outside. In this regard, it is conceivable to commence with the cleaning of the interior space and after a waiting time, which may last for around 7-8 seconds, to finally begin with the washing of the outside with the aid of suitable cleaning nozzles. The joint cleaning of the outside and the inside lasts for around 10-12 s, wherein the pipetting needle during the cleaning of the outside is advantageously moved along the cleaning nozzles.

In one special embodiment of the invention, the pipetting needle is moved from bottom to top during the cleaning of the outside, wherein the washing liquid flows downwards at the outside of the pipetting needle and is caught in a catch basin underneath the pipetting needle or aspirated away by a suitable aspiration. It is especially advantageous for this special configuration that an unwanted contamination of clean, especially already cleaned regions of the pipetting needle is ensured by the movement of the pipetting needle along the cleaning nozzles. The at least one pipetting needle being cleaned in this case is moved past the cleaning nozzles during the cleaning process, so that the washing is done starting from the upper clean region down to the contaminated lower region. Preferably, washing liquid is delivered at least partly at the same time through the interior space of the pipetting needle and in this way the pipetting needle is also cleaned internally. As described above, the inner cleaning preferably occurs in an interval process, wherein during the cleaning process washing liquid is delivered with different volume flows through the pipetting needle.

The technical solution according to the invention is characterized in that, after the conclusion of the cleaning process, a drying of the cleaned pipetting needle is performed by applying a suitable flow of drying agent, especially an air stream in the form of an air sword or air knife or air curtain. Preferably, the pipetting needle during the washing process is at first moved along the cleaning nozzles, in particular upwards, and after reaching an upper end point and conclusion of the washing process it is moved back into the lower end position. After this, the pipetting needle during a drying process is once again moved from the lower end position into the upper end position, wherein with the aid of at least one air nozzle an air stream is applied to the surface of the outside of the pipetting needle. The air stream here is configured as an air curtain, air sword or air knife, so that washing liquid remaining on the surface of the outside of the pipetting needle is stripped off downwards in the direction of the pipetting needle tip. Liquid dripping down beneath the pipetting needle is optionally caught or aspirated away with the aid of a suitable aspiration.

The device according to the invention furthermore preferably comprises a central control unit, which is connected to suitable sensors for detecting of metered values and on the basis of the operating parameters so detected of a device for the cleaning of a pipetting needle generates suitable control signals, so that the cleaning of the pipetting needle can be carried out in an automated fashion. In this way, it is conceivable to create at least one closed feedback control circuit in this manner. Of course, it is conceivable to integrate the central control unit into the control system of an analysis instrument or a laboratory control system, or at least to ensure a correspondingly suitable data exchange.

Besides a device for the cleaning of a pipetting needle, the invention also relates to a method for cleaning at least one pipetting needle, wherein an inside and an outside of the pipetting needle are brought into contact at least for a portion with a washing liquid, at least temporarily during a cleaning process, and with the aid of one movement means a relative movement is brought about between the pipetting needle and the washing station at least temporarily before, after, or during the cleaning process.

The method according to the invention is characterized in that at least one region of the pipetting needle brought into contact with washing liquid during the cleaning process is subjected to at least one flow of drying agent. Thus, with the aid of the method according to the invention, in a step following the actual cleaning of the pipetting needle the cleaned region is dried. For this, a flow of drying agent is used, which is applied to the surface, especially the surface of the outside of the pipetting needle. The flow of drying agent may be designed in the form of radiation, a heat flux, and/or an air stream. In an especially advantageous manner, an air stream as the flow of drying agent is applied to the outside of the pipetting needle, the air stream being designed in the form of an air sword, for example in fan shape, which strips off the washing liquid remaining on the surface of the pipetting needle against the direction of movement of the pipetting needle. Preferably, the liquid is conducted in this way in the direction of the pipetting needle and tip so that liquid removed from the pipetting needle can be finally caught in a catch basin or aspirated away by an aspiration.

In one advantageous embodiment of the invention, it is further provided that an inner cleaning of the pipetting needle being cleaned is done with the aid of a liquid stream, whose volume flow is varied during the cleaning. Preferably, the cleaning of the interior space of the pipetting needle is done in this case in four stages, whereby in a first cleaning step washing liquid with a volume flow of normal intensity is directed through the pipetting needle, in a second step only droplets of a washing liquid are delivered to the interior space of the pipetting needle, in a third step once more a normal washing liquid flow is delivered through the pipetting needle, while in conclusion washing liquid is delivered through the pipetting needle within a particularly short period of time, so that in this case one can almost speak of a "spitting" of the washing liquid. In this last step of the cleaning of the interior space of the pipetting needle being cleaned, any liquid droplets remaining at the needle tip are carried away and thus the interior space of the pipetting needle is completely cleaned and free of liquid.

According to the invention, a device for the cleaning of a pipetting needle with at least one of the technical features described above finds an application in an analysis instrument, an automatic laboratory analyser, an automatic stainer and/or in an automatic incubator. In an especially advantageous manner, the invention finds a use in an automatic stainer in the area of pathohistochemistry. In a corresponding automatic stainer, with which preferably tissue sections are investigated in a suitable manner, the individual pipetting needles must be cleaned between the individual staining steps, in order to reliably prevent stains and reagents from being carried between the individual steps of the method. It is advantageous in this case if not simply one, but rather a plurality of pipetting needles are preferably cleaned at the same time.

This plurality of needles is preferably fed at the same time to a corresponding cleaning device, wherein advantageously, at first, a cleaning of the interior space as well as the outside of the pipetting needle occurs, and in a second step the drying of the outside of the pipetting needle occurs with the aid of a suitable flow of drying agent, especially with the aid of an air stream.

Figure 1:
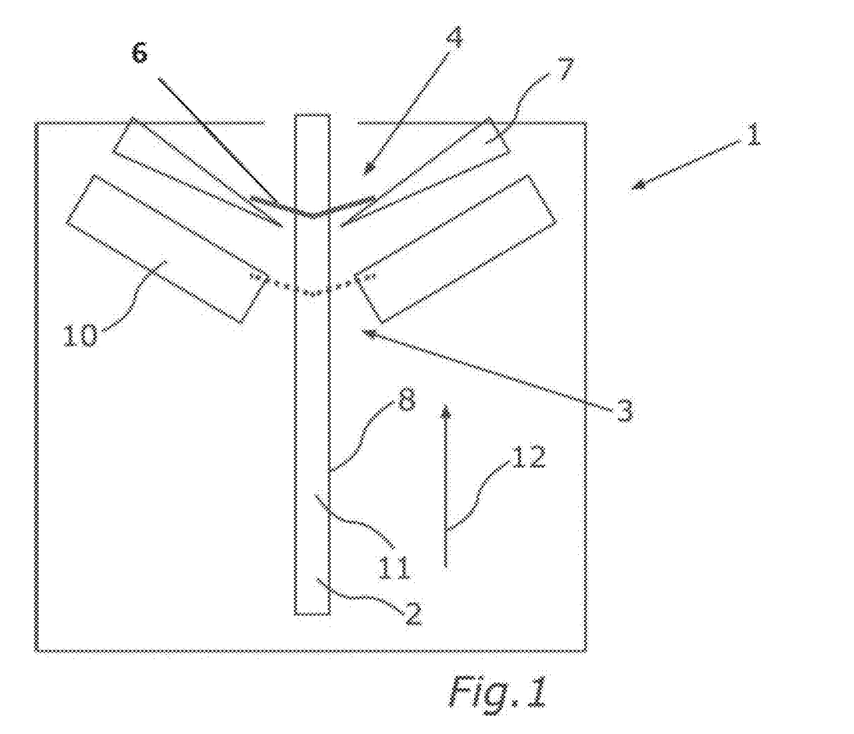
FIG. 1 shows a schematic representation of the layout of a device for the cleaning of pipetting needles.
Figure 2:
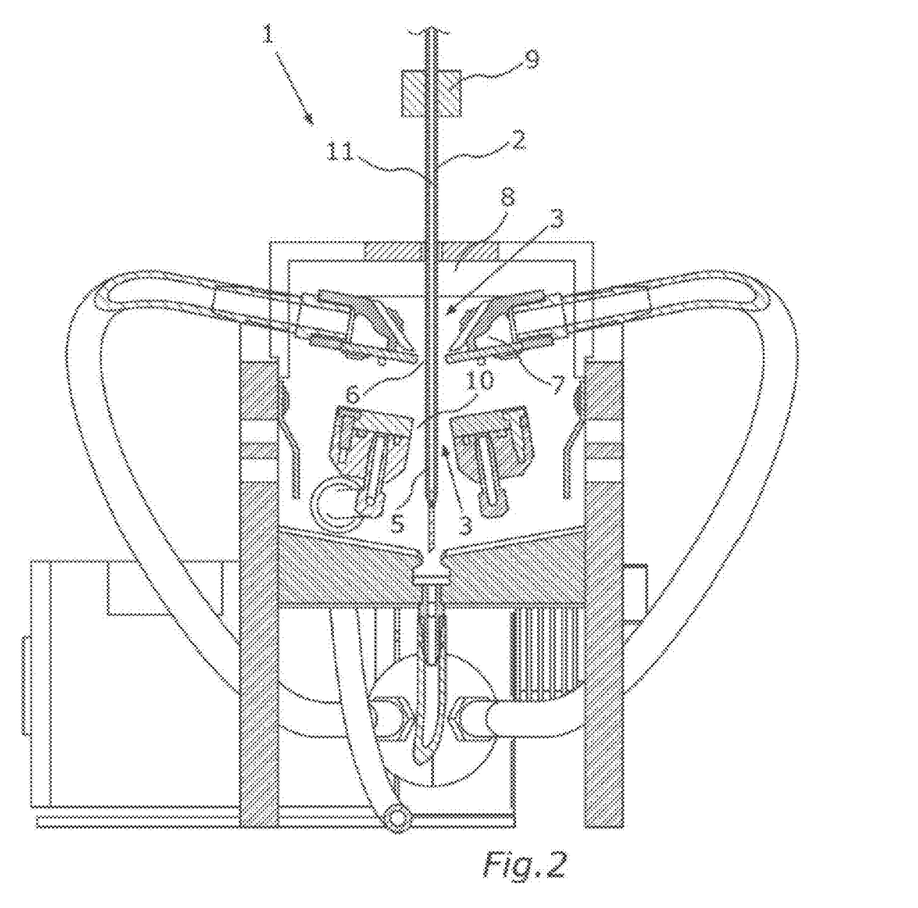
FIG. 2 shows a sectional view of a device for the cleaning of pipetting needles.
Figure 3:
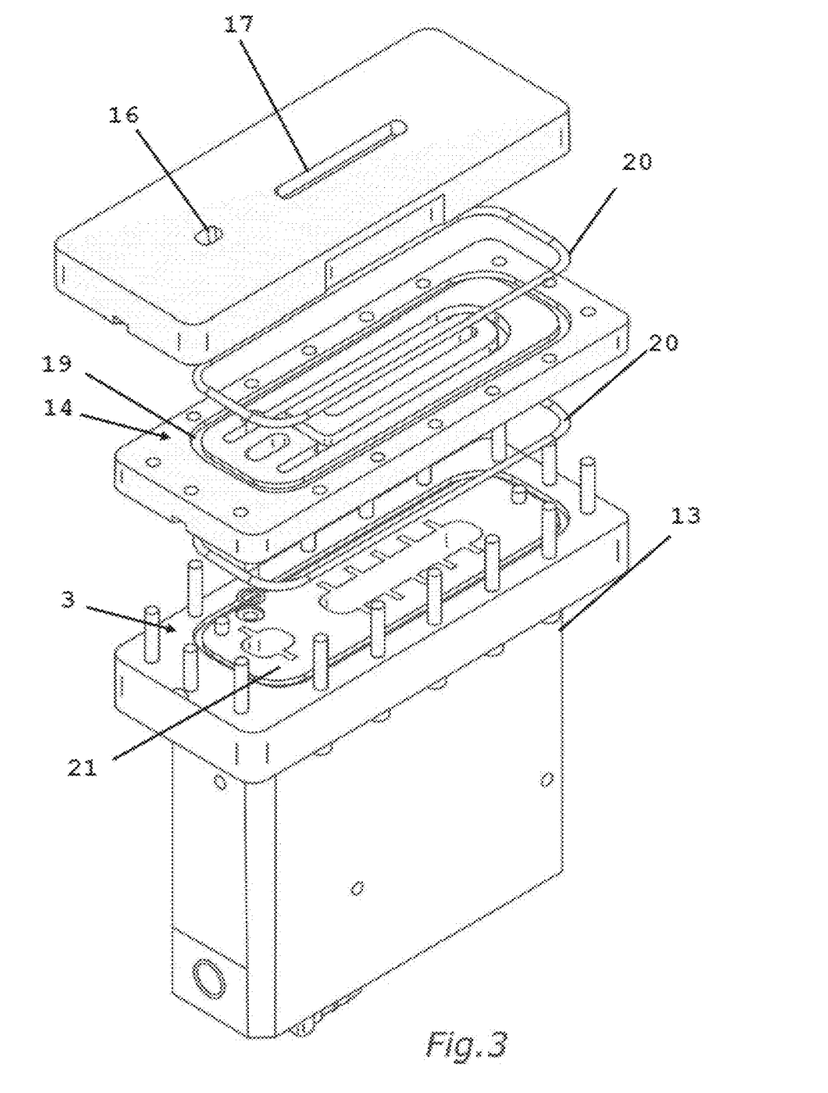
FIG. 3 shows a perspective exploded view of a device for the cleaning of pipetting needles.
Figure 4:
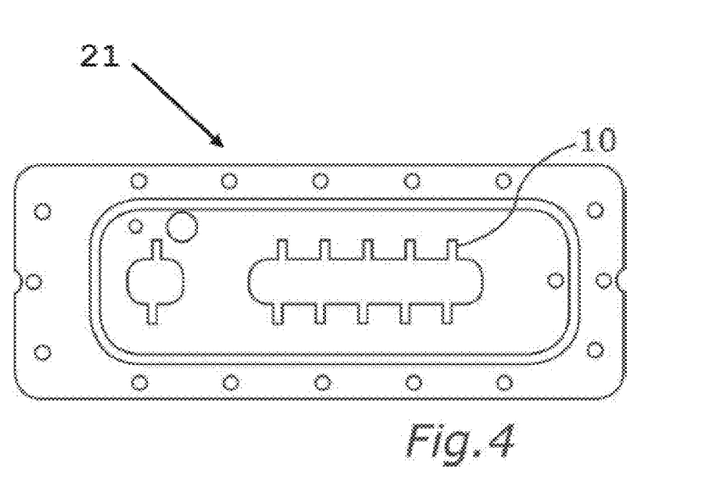
FIG. 4 shows a nozzle plate.
Figure 5:
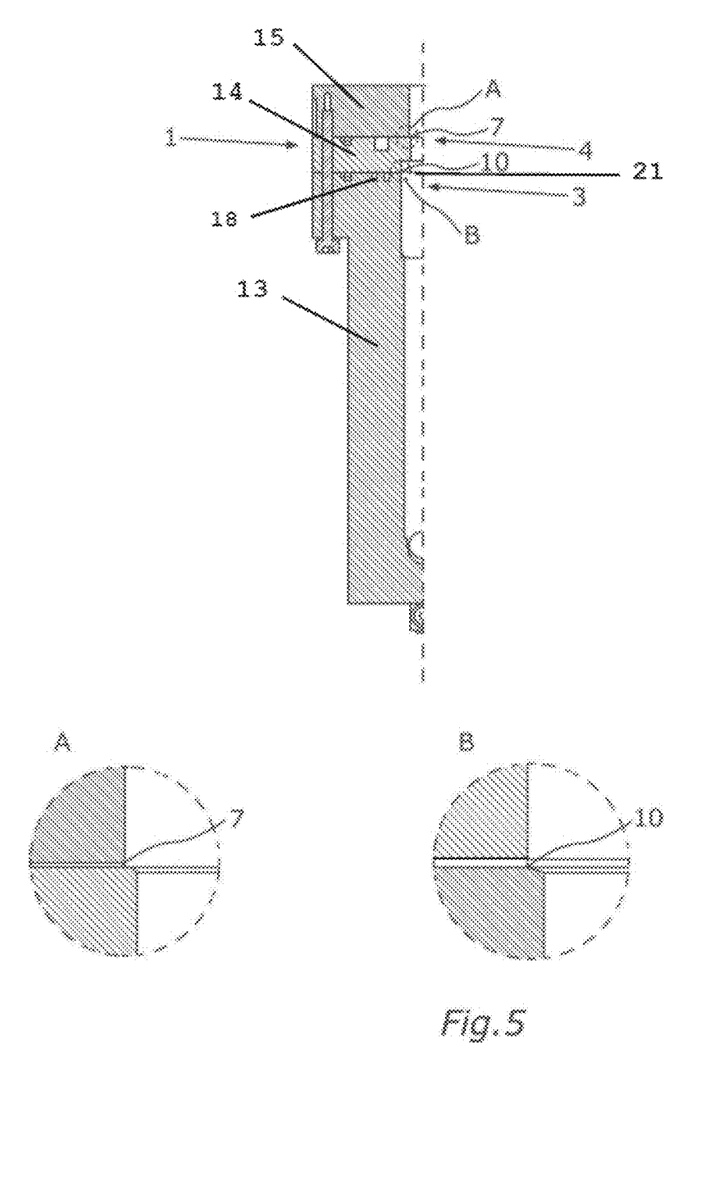
FIG. 5 shows a partial sectional view of a device for the cleaning of pipetting needles.
Figure 6:
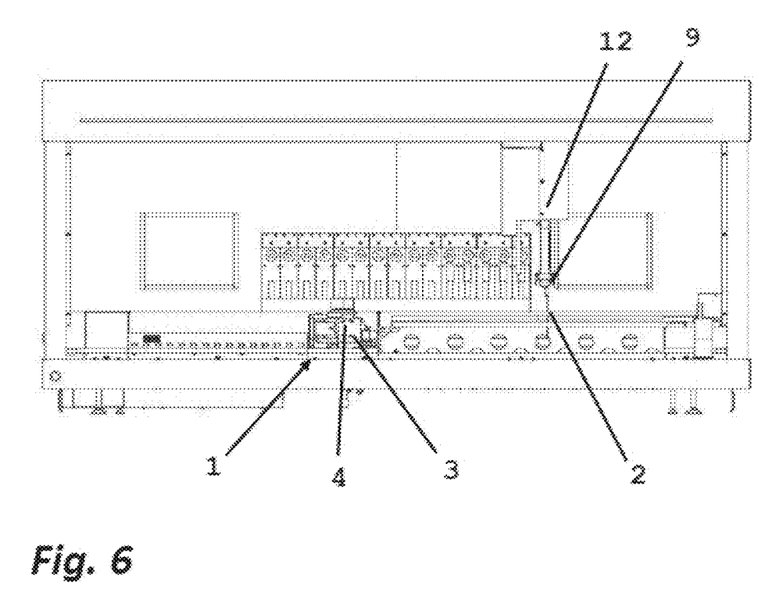
FIG. 6 shows an automatic stainer for histological investigations with a device for the cleaning of pipetting needles.
Figure 7:
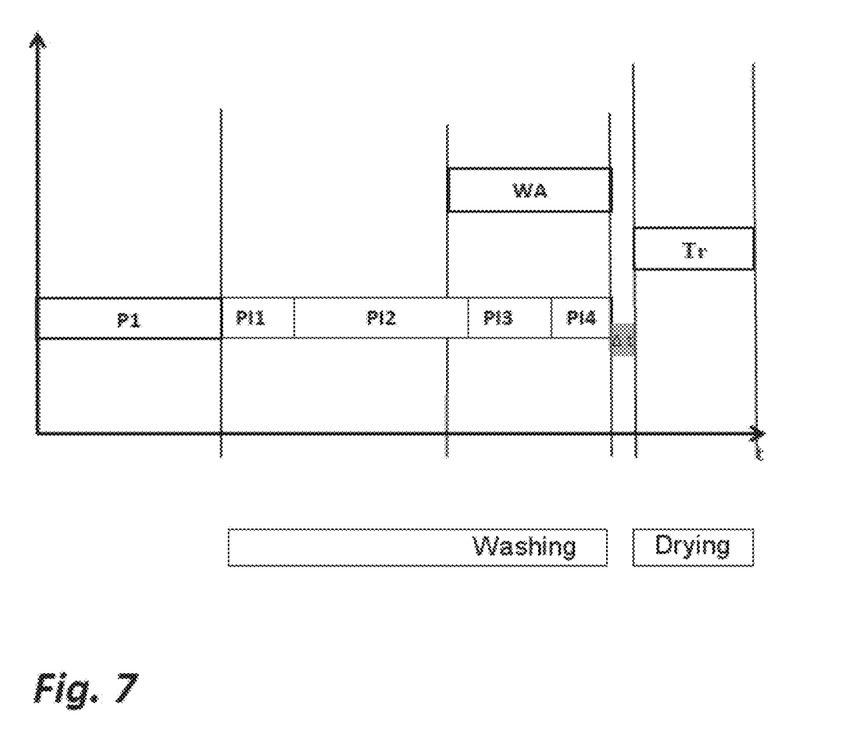
FIG. 7 shows a flow chart of a process for the cleaning and drying of a pipetting needle.

In the following, the invention will be described more closely without limiting the general idea of the invention by means of special exemplary embodiments, making reference to the figures. There are shown:

FIG. 1: Schematic representation of the layout of a device for the cleaning of pipetting needles;

FIG. 2: Sectional view of a device for the cleaning of pipetting needles;

FIG. 3: Perspective exploded view of a device for the cleaning of pipetting needles;

FIG. 4: Nozzle plate;

FIG. 5: Partial sectional view of a device for the cleaning of pipetting needles;

FIG. 6: Automatic stainer for histological investigations with a device for the cleaning of pipetting needles;

FIG. 7: Flow chart of a process for the cleaning and drying of a pipetting needle.

FIG. 1 shows in a schematic representation a device 1 according to the invention for the cleaning of pipetting needles 2. The pipetting needles 2 being cleaned are reusable pipettes with which liquid samples, reagents and/or stains can be taken up, transported, and dispensed as needed for various investigations in automatic laboratory analysers working in an automated fashion. In order to avoid a carry over of the samples, reagents and/or stains between the individual process steps of an investigation, reusable pipetting needles 2 which are arranged movably in the automatic laboratory analyser are cleaned between the individual process steps.

As can be seen from FIG. 1 in this context, a device 1 according to the invention for the cleaning of reusable pipetting needles 2 comprises a washing station, with which the pipetting needles 2 are cleaned on the inside and outside with the aid of a washing liquid, and a drying unit 4, which after the completion of the washing process dries at least the regions 5 of the outer surface of the pipetting needle 2 which have come into contact with washing liquid by means of a flow of drying agent 6, such as an air stream, a heat flux or radiation. In this way, it is ensured that the cleaned pipetting needle 2, especially its tip, no longer has any residues of washing liquid and is ready in dry form for the next process step.

The pipetting needles 2 fastened on a holder 9 and arranged movably inside an automatic laboratory analyser are at first introduced for their cleaning into the cleaning device 1 from above into a lower end position. After this, at first the interior space 11 of the pipetting needle 2 is cleaned with a washing liquid, which flows through the pipetting needle 2 from top to bottom. During the cleaning of the interior space 11 of the pipetting needle 2, the washing liquid is delivered in different intervals of time with differing volume flow through the pipetting needle 2. Preferably, the rinsing of the interior space occurs in four steps, whereby in a first and third step the interior space 11 of the pipetting needle 2 receives a normal volume flow of the requisite washing liquid, while in a first step only enough washing liquid is conducted through the pipetting needle 2 over a relatively short time interval so that it drips out from the tip of the pipetting needle 2. In the last cleaning step of the interior space 11, a relatively large quantity of washing liquid is conducted through the pipetting needle 2 in a very short period of time, so that one can almost call this a "spitting" of the washing liquid through it. In this last step, the last droplets of washing liquid and/or contaminants are carried away, so that after the conclusion of the interior space cleaning there is no washing liquid or contaminants on the pipetting needle 2. As already mentioned, it is conceivable, especially in dependence on the chosen pipette geometry, to vary the number of washing steps, the different time spans and/or the volume flows.

Already during the cleaning of the interior space 11 of the pipetting needle 2 there also commences the cleaning of the outer surface 8. For the cleaning of the outer surface 8 of the pipetting needle 2, the needle is moved upwards from the lower end position and at the same time a jet of washing liquid is directed around the surface 8 of the pipetting needle 2 with the aid of two oppositely arranged liquid nozzles 10. It is generally important to initiate a relative movement between pipetting needle 2 and the cleaning nozzles 10. Depending on the technical design, this could also be accomplished by having the pipetting needle 2 at rest, while the cleaning nozzles 10 are moved.

The two jets of washing liquid emerging from the oppositely arranged cleaning nozzles 10 are designed in a fan shape and are directed from opposite sides onto the outer surface 8 such that washing liquid impinges on the outer surface 8 over the entire circumference of the pipetting needle 2. Moreover, the cleaning nozzles 10 are designed so that the two jets of washing liquid are directed slightly downwards and thus against the direction of movement of the pipetting needle 2. In this way it is ensured, that already cleaned regions 5 on the outer surface 8 of the pipetting needle 2 do not come into contact with washing liquid that has been contaminated with contaminants, but instead washing liquid that has been contaminated with contaminants drains downwards in the direction of the pipette tip. The draining washing liquid, which is at least partly contaminated with contaminants, is caught in a catching container beneath the pipetting needle tip and/or aspirated away by means of a suitable aspiration.

Furthermore, it is provided that the components of the system, especially the requisite pump for the providing of a washing liquid to the cleaning nozzles 10 as well as the cleaning nozzles 10 themselves are designed such that the liquid jet emerging from the cleaning nozzles 10 cleans the outer surface 8 of the pipetting needle 2 not only chemically, but also substantially mechanically. In order to achieve this, a relatively hard liquid jet with high kinetic energy is generated and directed onto the outer surface 8 of the pipetting needle 2. The outer surface 8 of the pipetting needle 2 is thus not only wetted with suitable washing liquid, but also at the same time a mechanical cleaning of the outer surface 8 occurs, so that an especially good cleaning result is achieved in a relatively short time.

As soon as the pipetting needle 2 has reached the upper end position, i.e., the tip of the pipetting needle 2 has also been cleaned, the pipetting needle 2 is once more moved into the lower end position. After this, it is once more moved upwards, during which two air nozzles 7 of a drying unit 4 arranged above the cleaning nozzles 10 direct a downwardly slanting air stream 6 oriented against the direction of movement of the pipetting needle 2 onto the outer surface 8 of the pipetting needle 2. In general, it is likewise conceivable to move the pipetting needle 2 one time and to perform the cleaning as well as the drying step at the same time. It is likewise conceivable to arrange the air nozzles 7 of the drying unit not above the cleaning nozzles 10, but to the side of them, and to move the pipetting needle 2 to the side after the completed cleaning step and the movement into the lower end position and then to move it upwards for the drying. This design has the advantage that a longer region of the pipetting needle 2 can be cleaned and then dried.

The air stream 6 is configured as a so-called air sword, air knife or air curtain, so that washing liquid remaining on the outer surface of the pipetting needle 2 is reliably stripped off downwards against the direction of movement of the pipetting needle 2. The washing liquid stripped off downwards in this way from the outer surface 8 of the pipetting needle 2 against the direction of movement is once more caught in a suitable catching container beneath the tip of the pipetting needle 2 and/or aspirated away by means of an aspiration.

As soon as the pipetting needle 2 has once again reached the upper end position, not only the interior space and the outer surface have been cleaned, but it is ensured at the same time that no more washing liquid is present on the surfaces of the pipetting needle, especially at the tip of the pipetting needle.

FIG. 2 shows a device 1 according to the invention for the cleaning of a reusable pipetting needle 2, able to move inside an automatic laboratory analyser, which is in a condition of having been introduced into the washing station 3 of the cleaning device 1. With the aid of the cleaning device 1 shown, the pipetting needle 2 is cleaned in its interior 11 by conducting a suitable washing liquid through the pipetting needle 2. The washing liquid emerging from the interior space 11 during the cleaning, contaminated with contaminants, is caught in a catch basin arranged beneath the tip of the pipetting needle 2 and aspirated away from it, so that the contaminated washing liquid can be disposed of in a suitable manner, or reprocessed, provided this is possible. For the cleaning of the outer surface 8 of the pipetting needle 2 the washing station 3 has two oppositely arranged cleaning nozzles 10, from which washing liquid in the form of a fan-shaped liquid jet is applied to the outer surface 8 of the pipetting needle 2 during the cleaning process. During the cleaning process, the pipetting needle 2 is moved from a lower end position into an upper end position, so that the washing liquid flows downwards along the outer surface 8 of the pipetting needle 2 into the catch basin.

The jets of washing liquid directed from two opposite sides onto the outer surface 8 of the pipetting needle 2 on the one hand enclose the circumference of the pipetting needle 2 and on the other hand have such high kinetic energy that a mechanical cleaning of the outer pipette surface 8 is accomplished by the liquid jets. Contaminants present on the outer surface 8 of the pipetting needle 2, especially encrustations of samples, reagents and/or stains, are thus removed especially reliably and quickly from the outer surface 8 of the pipetting needle 2.

Furthermore, there are two air nozzles 7 of a drying unit 4 arranged on opposite sides of the pipetting needle 2 above the cleaning nozzles 10 in the cleaning device 1 shown in FIG. 2. These air nozzles 7 direct an air stream 6 onto the outer surface 8 of the pipetting needle 2, which is oriented downwards against the direction of movement of the pipetting needle 2. Thanks to the two air nozzles 7 of the drying unit 4 which are provided, an air stream 6 or air curtain in the form of an air sword is generated, which reliably strips off the washing liquid remaining on the outer surface 8 of the pipetting needle 2 against the direction of movement of the pipetting needle 2 towards the pipette tip. In this way, it is ensured that washing liquid remaining on the outer surface 8 of the pipetting needle 2 after the washing is reliably stripped off from it and caught in a catch basin located beneath the pipette tip 2 and ultimately aspirated away. After the end of the drying process, i.e., once the pipetting needle 2 is again at the upper end point, the reusable pipetting needle 2 is cleaned and in the dry state is ready to perform further tests in an automatically working automatic laboratory analyser.

In general it is conceivable in this regard to move the pipetting needle 2 a total of two times from bottom to top for its cleaning and drying, the washing step and the drying step being performed in succession. It is likewise basically conceivable for the pipetting needle 2 to move only once from its lower to its upper end point and during this span of time both the cleaning of the outer surface 8 of the pipetting needle 2 is done with the aid of the jets of washing liquid applied by the cleaning nozzles 10 and also at the same time the drying is done with the aid of an air stream 6 in the form of an air sword. It is important for the latter technical solution that the air nozzles 7 of the drying unit 4 be arranged behind the cleaning nozzles 10 in the direction of movement of the pipetting needle 2.

FIG. 3 shows another special embodiment of a device for the cleaning of reusable pipetting needles 2, such as can be used for example in automatic laboratory analysers to carry out histological or immunochemical investigations.

FIG. 3 shows an exploded representation of the cleaning device 1, having as its essential components a base body 13, an intermediate cover 14 as well as an upper end cap 15, of which the base body 13 and the intermediate cover 14 are each made of plastic and the upper end cap 15 of a suitable metal, and they are joined together by means of screw connections. Since the upper end cap 15 does not come into contact with washing liquid, it is possible to use a metal for this, especially since this material is better suited to the making of screw connections than plastic. On the inside of the cleaning device 1 there are provided two shafts 16, 17, where the smaller round shaft 16 can receive one pipetting needle 2 and the larger oval shaft 17 can receive five pipetting needles 2 for cleaning at the same time.

An important component provided between the base body 13 and the intermediate cover 14 is a nozzle plate 21, which together with the base body 13 encloses ducts 18 for the supplying of the cleaning nozzles 10 with washing liquid and also has recesses forming the cleaning nozzles 10. The configuration of the nozzle plate 21 will be explained more closely in connection with the description of FIG. 4.

Between the intermediate cover 14 and the upper end cap 15 are arranged air nozzles 7, the air supply ducts 19 and the air nozzles 7 being formed as recesses in the intermediate cover 14. In order to initiate a cleaning process, a single pipetting needle 2 and/or five pipetting needles 2 is/are at first introduced into the shafts 16, 17 provided for this purpose in the lower end position. During the washing and drying process, these are moved respectively upwards and past the cleaning nozzles 10 and the air nozzles 7 within the shafts 16, 17. The air nozzles 7 are arranged at a distance behind the cleaning nozzles 10 in the direction of movement of the pipetting needles 2, so that the air nozzles 7 are located in an installed position above the cleaning nozzles 10.

The cleaning nozzles 10 are arranged respectively on both sides of the pipetting needles 2 being cleaned and apply a fan-shaped jet of washing liquid onto the respective outer surfaces 8 of the pipetting needles 2 from opposite sides, the liquid jets having such high kinetic energy that not only a chemical, but also a mechanical cleaning of the respective pipetting needles 2 takes place. The liquid jet(s) are directed downwards in this context, so that washing liquid contaminated with contaminants drains downwards against the direction of movement of the pipetting needles 2 moving upwards during the cleaning. The washing liquid draining in this way is caught in the lower region of the shafts 16, 17 in the base body 13 in a catch basin and aspirated away by an aspiration.

The air nozzles 7 with which the drying of the outer surfaces 8 of the pipetting needles 2, provided according to the invention, is accomplished by the formation of an air stream 6 in the form of an air sword or air knife are arranged between the top side of the intermediate cover 14 and the upper end cap 15. The intermediate cover 14 is designed such that the air is led through corresponding air ducts 19 in the intermediate cover 14, which are enclosed by the upper end cap 15, to the air nozzles 7. The air nozzles 7 in turn are designed such that the air stream 6 in the form of an air sword impinges in a manner slanting downwards, against the direction of movement of the pipetting needle 2 during the drying process, onto the outer surface 8 of a pipetting needle 2. Since one air nozzle 7 is arranged respectively on opposite sides of a moving pipetting needle 2, washing liquid present on the outer surface 8 of the pipetting needle 2 is stripped off from the entire circumference against the direction of movement of the pipetting needle 2 with the aid of the generated air sword. The formation of the air stream 6 is accomplished by a suitable configuration of the edges in the region of the air nozzles 7. Here as well it is generally conceivable to strengthen the edges with a metal sheet or to design the air nozzles 7 as a sheet metal part, especially as a nozzle plate 21. The edges surrounding the air nozzles 7 have a radius or bevel for this purpose, so that the air stream 6 follows this contour.

The drying of the pipetting needles 2 with the aid of an air stream formed as an air sword reliably ensures that after the conclusion of the washing and drying process a fully cleaned and dried pipetting needle 2 is available for further tests in the analysis instrument.

In order to preferably organize the liquid jets and air streams forming so-called air swords enclosing the pipetting needles 2 in the shape of a fan in the horizontal plane and to deflect them downwards in the vertical direction, corresponding radii or bevels are therefore provided in the region of the respective nozzle openings in the nozzle plate 21 and/or in the intermediate cover 14, which the respective streams follow.

Corresponding O-ring seals 20 are provided both between the base body 13 and the intermediate cover 14 and between the intermediate cover 14 and the upper end cap 15, so that no washing liquid or air can escape to the outside. Furthermore, feed lines are provided to supply the necessary fluid to the washing liquid ducts 18 and air ducts 19.

The nozzle plate 21 arranged in the cleaning device between base body 13 and intermediate cover 14 is further shown as an individual part in FIG. 4. The nozzle plate 21 has in this case an at least approximately round and an oval borehole with additional recesses. During a cleaning process, a pipetting needle 2 can be moved in the vertical direction through the round borehole, while up to five pipetting needles 2 arranged next to each other in parallel can be moved vertically at the same time in the oval borehole. Of course, it is conceivable to modify the cleaning device 1 or the nozzle plate 21 such that even more, especially eight pipetting needles 2 can be moved and thus washed and dried at the same time. The cleaning nozzles 10 are formed by the additional rectangular recesses, so that with the nozzle plate 21 shown in FIG. 4 a total of twelve cleaning nozzles 10 are provided.

The supplying of the washing liquid to the rectangular recesses arranged respectively opposite at the oval and the round borehole occurs through ducts 18 which in the installed state of the nozzle plate 21 are formed between it and the base body 13 of the cleaning device 1, as shown in FIG. 3. The additional recesses at the boreholes are configured such that, with a nozzle plate 21 in the installed state, the cleaning nozzles 10 generate a liquid jet shaped as a fan in the horizontal plane, which is furthermore directed downwards and thus against the direction of movement of the pipetting needles 2 during the cleaning process. Since two cleaning nozzles 10 are arranged respectively oppositely on both sides of a pipetting needle 2, the pipetting needles 2 moving past the cleaning nozzles 10 are reliably cleaned over the entire circumference. The jet formation is accomplished by a suitable configuration of the edges of the nozzle plate 21 in the area of the recesses forming the nozzles 10. In this area, the nozzle plate 21 has suitable radii or bevels at the edges, whose contour is followed by the liquid jet.

FIG. 5 shows for further clarity in a partial sectional view one side of the cleaning device 1 with base body 13, intermediate cover 14 and end cap 15, being screwed together. Between the base body 13 and the intermediate cover 14 is clamped a nozzle plate 21, which is designed as was explained in connection with the description of FIG. 4 and via which a jet of washing liquid is applied on the corresponding cleaning nozzles 10 from two sides onto the pipetting needles 2 being cleaned.

In the detail view "B", a special embodiment of a cleaning nozzle 10 of the nozzle plate 21 clamped between base body 13 and intermediate cover 14 is shown. The important point here is that the nozzle plate 21 has a respective radius or a bevel at its edges in the area of the liquid exit, so that the emerging liquid jet is not only directed downwards, which is accomplished by a suitable formation of the edges of the base body 13 in this region, but also emerges in the shape of a fan and with such high kinetic energy at the same time that a mechanical cleaning action is accomplished. Since two cleaning nozzles 10 are arranged respectively on opposite sides of a moving pipetting needle 2, the pipetting needle 2 is reliably cleaned over its entire circumference.

In addition, the detail view "A" of FIG. 5 shows the shape of an air nozzle 7, which is arranged between the intermediate cover 14 and the upper end cap 15. The intermediate cover 14 in this case is configured such, or has a suitable air duct incorporated into it, that an air gap is formed. Here as well, a radius or a bevel is provided in the lower outlet region of the nozzle 7, so that the air stream 6 exiting from the air nozzle 7 is deflected downwards and formed so that the air nozzles 7 once again arranged on either side of the pipetting needle 2 place a so-called air sword along a circumferential line of the outer pipetting needle surface 8 and thus washing liquid remaining on the outer surface 8 is reliably stripped off downwards against the direction of movement of the pipetting needle 2.

FIG. 6 shows in a front view an automatic stainer for histological investigation of tissue sections. Such automatic laboratory analysers are characterized in that a multitude of tissue sections are treated with reagents and/or suitable stains in automated fashion and in dependence on the particular investigations. Such an automatic laboratory analyser has pipetting needles 2 arranged movably in the automatic machine, by which the respectively required liquids are taken up, transported, and applied to the tissue section provided for here. Between the individual incubation steps, the pipetting needles 2 need to be cleaned reliably, so that carrying over reagents and/or stains between the individual test steps is reliably avoided.

The automatic stainer shown in FIG. 6 has for this purpose a cleaning device 1 according to the invention for the cleaning and drying of the pipetting needles 2 used in the automatic machine. In the cleaning device 1 there is a washing station 3 with cleaning nozzles 10, so that the pipetting needles 2 are freed of contaminants on both their outer surfaces 8 and in their interior 11. Furthermore, the cleaning device 1 has a drying device 4, so that pipetting needles 2 cleaned with the aid of washing liquid on their outer surfaces 8 are freed of washing liquid remaining on the outer surface 8 after the washing process with the aid of an air stream 6, which is preferably configured as a fan-shaped air sword.

Preferably one, preferably a plurality of pipetting needles 2 are cleaned at the same time, both on the inside and on the outside, by means of a washing liquid and then dried with the aid of air nozzles 7, which place an air sword around the surfaces of the Opening needles 2. After the cleaning and drying of the reusable pipetting needles 2 are completed, they are available to perform further tests. The cleaning of the pipetting needles 2 occurs here especially thoroughly and relatively fast thanks to the use of the invention. Thanks to the drying step additionally provided by the invention, it is ensured that, after the end of the cleaning, no washing liquid remains on the pipetting needles 2, especially in the region of the tips, and thus unwanted dilution of the fluids subsequently taken up, especially reagents and/or stains, is prevented. The providing of a cleaning device 1 according to the invention in an automatic stainer for the carrying out of immunochemical and/or histological tests thus enables a rapid and at the same time a thorough cleaning of reusable pipetting needles 2 and furthermore guarantees that falsification of test results on account of unwanted dilution of the reagents or stains is avoided.

Finally, FIG. 7 shows schematically a preferred sequence of a pipetting needle cleaning, during which the cleaning of the interior space 11 as well as the outer surface 8 occurs at least temporarily simultaneously. During a first process step P1 at least one pipetting needle is introduced into a cleaning device according to the invention and residual fluid present in the pipetting needle is relinquished into a catch basin. After this, the washing process commences, by washing liquid being slowly introduced into the pipetting needle 2 in a first washing step WI1. In a second washing step WI2, which lasts significantly longer than the first, the volume flow introduced into the pipetting needle 2 is significantly reduced, so that now washing liquid contaminated with contaminants merely drips out from the tip of the pipetting needle 2.

After around three quarters of the time provided for the second washing step W2 of the interior space 11 of the pipetting needle 2 has elapsed, the washing of the outer surface commences in process step WA, by the pipetting needle 2 being moved upwards inside the washing station 3 and the cleaning nozzles 10 being activated, so that a liquid jet, as already described, is applied to the outer surface 8 moving past the cleaning nozzles 10. After around a third of the time provided for the washing of the outer surface of the pipetting needle in process step WA has elapsed, the volume flow of the washing liquid conducted through the interior space 11 is increased in a third washing step WI3, so that the pipetting needle 2 once again receives a slow flow of washing liquid through it, as in the first inner cleaning step WI1. During the last third of the time provided for the washing of the outer surface 8, an especially high volume flow of washing liquid is delivered through the interior 11 of the pipetting needle 2 over a short time in a fourth inner washing step WI4, so that one may speak here of a "spitting" of washing liquid through the pipetting needle 2. In this way, the last traces of the washing liquid are reliably removed from the pipetting needle 2 and from its tip. After the end of the inner cleaning process and the washing of the outer surface 8, the pipetting needle 2 is moved downwards into the lower end position.

There now commences the drying process Tr, wherein the pipetting needle 2 is moved from bottom to top into an upper end position and at the same time moved past two air nozzles 7 arranged on both sides of the pipetting needle 2. In this way, washing liquid remaining after the washing on the outer surface 8 is stripped off downwards against the direction of movement of the pipetting needle 2 with an air stream 6 and conducted into a catch basin arranged underneath the pipetting needle 2, from which the washing liquid is taken away, in particular, aspirated. After the conclusion of the described combined cleaning and drying process, including an interval by interval cleaning of the interior 11 of a pipetting needle 2, a fully cleaned and dried pipetting needle 2 is available for conducting further tests.

LIST OF REFERENCE NUMBERS

1 Cleaning device
2 Pipetting needle
3 Washing station
4 Drying device
5 Cleaned region of the pipetting needle
6 Flow of drying agent
7 Air nozzle
8 Outer surface of the Opening needle
9 Holder
10 Liquid nozzle
11 Inner surface
12 Movement means
13 Base body
14 Intermediate cover
15 Upper end cap
16 Shaft for a pipetting needle
17 Shaft for a plurality of pipetting needles
18 Liquid supply
19 Air supply
20 Seal
21 Nozzle plate Any ranges mentioned herein include all values and subvalues between the lowest and highest limit of this range.

European patent application 17001318.9, filed Aug. 1, 2017, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method for cleaning at least one pipetting needle with a washing station, the method comprising:
    providing a washing station comprising at least two air nozzles and at least two cleaning nozzles disposed inside the washing station, wherein the at least two air nozzles are disposed above the at least two cleaning nozzles;
    inserting said at least one pipetting needle into the washing station with at least one movement apparatus;
    moving said at least one pipetting needle relative to the washing station with the at least one movement apparatus before, during, or after the cleaning process, wherein the cleaning process comprises washing and drying the at least one pipetting needle;
    washing an interior surface of the at least one pipetting needle by contacting the interior surface of the at least one pipetting needle with a washing liquid;
    washing an exterior surface of the at least one pipetting needle by directing a jet of the washing liquid from the at least two cleaning nozzles downwards against a direction of movement of the at least one pipetting needle; and
    drying the exterior surface of the at least one pipetting needle by directing a flow of an air stream from said at least two air nozzles downwards against the direction of movement of the at least one pipetting needle.

2. The method according to claim 1, wherein the air stream is in a form of a fan-shaped sword directed onto the exterior surface of the at least one pipetting needle.

3. The method according to claim 1, wherein the movement apparatus comprises a holder for fastening the at least one pipetting needle, and wherein the method further comprises moving the at least one pipetting needle relative to the washing station during the cleaning process.

4. The method according to claim 1, wherein the method further comprises washing the exterior surface of the at least one pipetting needle with the jet of the washing liquid at least temporarily during the cleaning process.

5. The method according to claim 1, the method further comprising:
    during the cleaning process, moving the at least one pipetting needle with the movement apparatus at least temporarily in an upwards direction relative to the washing station.

6. The method according to claim 1, the method further comprising delivering at least two separate volumes of the washing liquid on the interior surface of the at least one pipetting needle during the cleaning process.

7. The method according to claim 1, wherein the interior surface and the exterior surface of the at least one pipetting needle are washed at least temporarily simultaneously.

8. The method according to claim 2, further comprising moving the at least one pipetting needle while directing the air stream onto the exterior surface of the at least one pipetting needle, thereby stripping off the washing liquid on the exterior surface of the at least one pipetting needle against the direction of movement of the at least one pipetting needle.

9. The method according to claim 4, the method further comprising:
    during the cleaning process, moving the at least one pipetting needle upwards at least temporarily by the movement apparatus past the at least two cleaning nozzles.

* * * * *